(12) United States Patent
Tong et al.

(10) Patent No.: US 8,528,314 B2
(45) Date of Patent: Sep. 10, 2013

(54) METHOD AND APPARATUS FOR COMBINED CYCLE POWER PLANT STARTUP

(75) Inventors: Leslie Yung-Min Tong, Roswell, GA (US); Diego Fernando Rancruel, Mauldin, SC (US); Tailai Hu, Lake Wylie, SC (US); Joel Donnell Holt, Charlton, NY (US)

(73) Assignee: General Electric Company, Schenectady, NY (US)

( * ) Notice: Subject to any disclaimer, the term of this patent is extended or adjusted under 35 U.S.C. 154(b) by 892 days.

(21) Appl. No.: 12/698,227

(22) Filed: Feb. 2, 2010

(65) Prior Publication Data

US 2011/0185744 A1      Aug. 4, 2011

(51) Int. Cl.
*F02C 7/26* (2006.01)
(52) U.S. Cl.
USPC ........ 60/39.182; 60/39.19; 60/793; 60/39.21; 60/670; 122/7 R; 137/599.06; 137/599.07
(58) Field of Classification Search
USPC ........... 60/39.181, 39.182, 39.19, 793, 39.21, 60/670; 122/7 R, 7 B; 137/599.05, 599.06, 137/599.07
See application file for complete search history.

(56) References Cited

U.S. PATENT DOCUMENTS

| | | | |
|---|---|---|---|
| 3,577,733 A | | 5/1971 | Manuel |
| 3,879,616 A | * | 4/1975 | Baker et al. .................. 290/40 R |
| 3,953,966 A | * | 5/1976 | Martz et al. ...................... 60/783 |
| 4,036,011 A | * | 7/1977 | Gupta ......................... 60/39.182 |
| 4,081,956 A | * | 4/1978 | Baker et al. ................ 60/39.182 |
| 4,201,924 A | | 5/1980 | Uram |
| 4,793,132 A | * | 12/1988 | Okabe ......................... 60/39.182 |
| 5,203,160 A | * | 4/1993 | Ozono ............................. 60/778 |
| 5,267,434 A | * | 12/1993 | Termuehlen et al. ....... 60/39.182 |
| 5,577,377 A | * | 11/1996 | Tomlinson ...................... 60/783 |
| 2007/0113562 A1 | | 5/2007 | Tomlinson et al. |
| 2009/0145104 A1 | | 6/2009 | Alexander et al. |
| 2009/0158738 A1 | | 6/2009 | Hu et al. |

OTHER PUBLICATIONS

Casella, Francesco, "Fast Start-up of a Combined-Cycle Power Plant: a Simulation Study with Modelica", 2006, The Modelica Association, pp. 1-10.*

* cited by examiner

*Primary Examiner* — Phutthiwat Wongwian
*Assistant Examiner* — Steven Sutherland
(74) *Attorney, Agent, or Firm* — Dority & Manning, PA

(57) ABSTRACT

A combined cycle power plant startup system is provided. The system includes a steam turbine, a HRSG, a condenser, and a bypass system. The steam turbine may include a turbine section. The HRSG may be operably connected to the steam turbine for providing steam to the steam turbine. The HRSG may include a reheater. The bypass system may be configured to adjust the steam pressure downstream of the reheater by routing steam downstream of the reheater to the condenser. The bypass system may include at least one bypass line, at least one control valve operably connected to the at least one bypass line, a pressure gauge configured to monitor the steam pressure downstream of the reheater, and a controller configured to communicate with the pressure gauge and operate the at least one control valve.

16 Claims, 1 Drawing Sheet

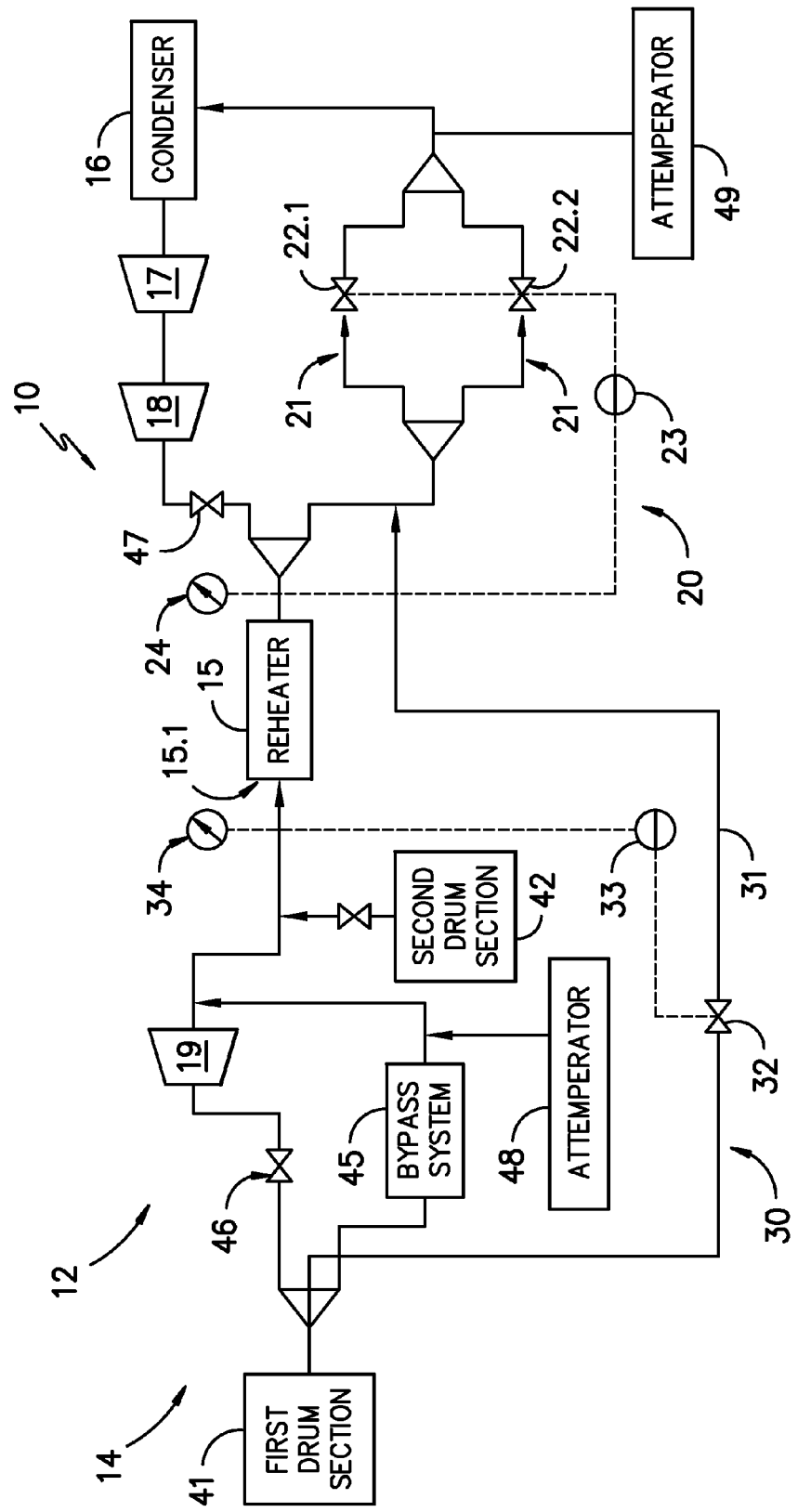

METHOD AND APPARATUS FOR COMBINED CYCLE POWER PLANT STARTUP

FIELD OF THE INVENTION

The subject matter disclosed herein relates generally to combined cycle power plants, and more specifically to methods and apparatus for startup of a combined cycle power plant.

BACKGROUND OF THE INVENTION

A conventional combined cycle power plant generally includes one or more gas turbines, heat recovery steam generators ("HRSG's"), and a steam turbine. Because excessive steam pressures generated when the gas turbine is operating at high- or full-load can stress steam turbine components during steam turbine startup, traditional combined cycle power plant startup procedures require placing low load holds on the gas turbines and placing restrictions on gas turbine loading rates to control steam pressure during steam turbine startup.

Such holds and restrictions contribute to high gas turbine exhaust emissions during startup, increased startup and loading times, and increased fuel consumption during startup and loading. Thus, by holding gas turbines at low loads and loading rates, the gas turbines are forced to operate at low efficiency with high exhaust emissions during steam turbine startup and loading. Further, low gas turbine loads and loading rates cause the revenues generated by combined cycle power plants to be lower during steam turbine startup and loading.

Various strategies are known in the art for providing combined cycle power plant startup procedures which allow gas turbines and HRSG's to be operated under normal operating conditions during steam turbine startup and loading. For example, one strategy is to include additional piping and valves in combined cycle power plants, to lower steam pressures prior to admission to the steam turbine by routing excess steam to equipment designed to contain the steam, such as to a condenser. However, the addition of piping to a combined cycle power plant is expensive. Additionally, the space available for additional piping in a combined cycle power plant may be limited, and the installation of additional piping may be difficult. Further, the configuration of additional piping in a combined cycle power plant may cause large, uncontrollable pressure drops, which can damage the power plant.

Thus, an improved system and method for combined cycle power plant startup is desirable in the art. For example, a system and method for routing steam flow during steam turbine startup and loading, to lower steam pressures prior to admission to the steam turbine while allowing gas turbines and HRSG's to operate under normal operating conditions would be advantageous. Additionally, a combined cycle power plant startup system that uses existing power plant piping may be desirable. Further, a combined cycle power plant startup system that is inexpensive, easy to install, and controllable under all power plant operating conditions would be accepted in the art.

BRIEF DESCRIPTION OF THE INVENTION

Aspects and advantages of the invention will be set forth in part in the following description, or may be obvious from the description, or may be learned through practice of the invention.

In one embodiment, a combined cycle power plant startup system is provided that includes a steam turbine, a HRSG, a condenser, and a bypass system. The steam turbine may include a turbine section. The HRSG may be operably connected to the steam turbine for providing steam to the steam turbine. The HRSG may include a reheater. The bypass system may be configured to adjust the steam pressure downstream of the reheater by routing steam downstream of the reheater to the condenser. The bypass system may include at least one bypass line, at least one control valve operably connected to the at least one bypass line, a pressure gauge configured to monitor the steam pressure downstream of the reheater, and a controller configured to communicate with the pressure gauge and operate the at least one control valve. The steam pressure may thus be adjusted to a pressure range suitable for admission to the turbine section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended FIGURE, in which:

FIG. 1 provides a schematic diagram of one embodiment of the combined cycle power plant startup system of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 is a schematic diagram of one embodiment of a combined cycle power plant startup system 10. The system 10 may include a gas turbine (not shown), a steam turbine 12, a heat recovery steam generator ("HRSG") 14, and a condenser 16. For example, the HRSG 14 and the condenser 16 may be operably connected to the steam turbine 12. Further, the system 10 may include more than one gas turbine, steam turbine 12, HRSG 14, and condenser 16.

The steam turbine 12 may include a turbine section 18. For example, in one embodiment, the turbine section 18 may be an intermediate pressure turbine. The steam turbine 12 may further include other turbine sections such as, for example, turbine sections 17 and 19. For example, in one embodiment, turbine section 17 may be a low pressure turbine. In one embodiment, turbine section 19 may be a high pressure turbine. The steam turbine 12 may further include other turbine sections. It should be understood that the turbine sections 17, 18 and 19 of the present disclosure are not limited to low pressure, intermediate pressure and high pressure turbines, but may be any turbine, turbine section, or turbine component that is operable in a steam turbine.

The HRSG 14 may include a first drum section 41, a second drum section 42, and a reheater 15. The first drum section 41 and second drum section 42 may be configured to provide steam to various components of the system 10. For example, in one embodiment, the first drum section 41 may be a high pressure drum section, which may be coupled with a downstream superheater section (not shown). The high pressure drum section and superheater section may supply superheated steam at a high pressure. The steam supplied by first drum section 41 may be routed to a turbine section, such as to turbine section 19. A control valve 46 may be configured to control the supply of steam to the turbine section 19. Further, the steam may be routed to a bypass system 45 when, for example, the turbine section 19 is offline. The bypass system 45 may be, for example, a cascading bypass system. After passing through turbine section 19 and bypass system 45, the steam may then be routed to the reheater 15.

In an exemplary aspect of an embodiment, the second drum section 42 may be an intermediate pressure drum section, and the intermediate pressure drum section may supply steam at an intermediate pressure. The steam supplied by second drum section 42 may be routed to the reheater 15. Further, in one embodiment, the steam supplied by second drum section 42 may be combined with the steam downstream of the turbine section 19 and the bypass system 45 before the steam is admitted to the reheater 15.

The reheater 15 may be configured to heat steam supplied by various components of system 10 before the steam is admitted to turbine section 18. For example, steam downstream of first drum section 41, turbine section 19, bypass system 45, and second drum section 42 may be admitted to the reheater 15 through reheater inlet 15.1. This steam may be heated in the reheater 15, such as to a hot reheat steam temperature, before the steam is admitted to the pressure turbine 18. A control valve 47 may be configured to control the supply of steam to the turbine section 18.

Thus, in an exemplary aspect of an embodiment, under normal operating conditions, the first drum section 41 of the HRSG 14 may supply steam to the turbine section 19 of the steam turbine 12. The steam may be at a relatively high pressure, and the first drum section 41 and the turbine section 19 may be a high pressure drum section and a high pressure turbine, respectively. For example, in one embodiment, the steam may be supplied from the first drum section in a range from approximately 1800 to approximately 2500 pounds per square inch atmospheric ("psia"), or any subrange therebetween.

After energy is extracted from the steam by the turbine section 19, the steam may then be supplied to the reheater 15 for reheating. In one embodiment, before the steam enters the reheater 15 through reheater inlet 15.1, the steam may be combined with steam supplied by the second drum section 42 of the HRSG 14. The steam supplied by the second drum section 42 may be at a relatively intermediate pressure, and the second drum section 42 may be an intermediate pressure drum section. For example, in one embodiment, the steam may be supplied from the second drum section in a range from approximately 100 to approximately 380 psia, or any subrange therebetween.

The steam downstream of the first drum section 41, turbine section 19, bypass system 45, and second drum section 42 may then enter the reheater 15 through the reheater inlet 15.1. The reheater 15 may be configured to heat the steam before the steam is admitted to turbine section 18, such as to a hot reheat steam temperature. Under normal operating conditions, after the steam is heated by the reheater 15, the steam may then be supplied to the turbine section 18. The steam downstream of the reheater 15 may be at a relatively intermediate pressure, and the turbine section 18 may be an intermediate pressure turbine. In one embodiment, the steam downstream of the reheater 15 may be supplied from the reheater 15 at a pressure exceeding 120 psia. For example, under normal operating conditions, the steam downstream of the reheater 15 may be supplied from the reheater 15 in a range from approximately 250 to approximately 380 psia, or any subrange therebetween.

After energy is extracted from the steam in the turbine section 18, the steam may be supplied to the turbine section 17. The steam supplied by the turbine section 18 may be at a relatively low pressure, and the turbine section 17 may be a low pressure turbine. For example, in one embodiment, the steam may be supplied from the turbine section 18 to the turbine section 17 in a range from approximately 15 to approximately 60 psia, or any subrange therebetween.

After energy is extracted from the steam in the turbine section 17, the steam may be supplied to the condenser 16. The condenser 16 may operate to condense the steam, which may then be supplied back to the system 10.

It should be understood that the pressure ranges disclosed for the normal operating conditions of the turbine sections 17, 18 and 19, the first and second drum sections 41 and 42, and the reheater 15 are merely illustrative of the normal operating conditions of a combined cycle power plant. Operation of the turbine sections 17, 18 and 19, the first and second drum sections 41 and 42, and the reheater 15 are not limited to those pressure ranges disclosed. Rather, the turbine sections 17, 18 and 19, the first and second drum sections 41 and 42, and the reheater 15 may be operated in any pressure ranges known in the steam turbine art.

The system 10 may further include attemperators 48 and 49. In one embodiment, attemperator 48 may be configured to cool steam as it exits the bypass system 45. In one embodiment, attemperator 49 may be configured to cool steam before it enters the condenser 16.

The system 10 may further include a first bypass system 20. The first bypass system 20 may be configured to adjust the pressure of steam downstream of the reheater 15 by routing steam downstream of the reheater 15 to the condenser 16. For example, in one embodiment, the first bypass system 20 may be an intermediate pressure bypass system. Routing stream downstream of the reheater 15 to the condenser 16 may adjust the pressure of the steam downstream of the reheater 15 to a pressure range suitable for admission to the turbine section 18.

In an exemplary aspect of an embodiment, the first bypass system 20 may be configured to adjust the pressure of steam downstream of the reheater 15 to a pressure range suitable for startup of the turbine section 18. In another exemplary aspect of an embodiment, the first bypass system 20 may be configured to adjust the pressure of steam downstream of the reheater 15 to a pressure range suitable for shutdown of the turbine section 18. For example, in one embodiment, the pressure ranges suitable for startup and shutdown of the turbine section 18 are the same. In another embodiment, the pressure range suitable for startup of the turbine section 18 is different from the pressure range suitable for shutdown of the turbine section 18. In one embodiment, startup or shutdown of the turbine section 18 may occur while the gas turbine and the HRSG 14 are operating at normal operating conditions.

For example, in an exemplary aspect of an embodiment, the turbine section 18 may be an intermediate pressure turbine. The pressure range of steam that may be suitable for admission to the intermediate pressure turbine, such as, for example, for startup or shutdown of the intermediate pressure turbine, may be from approximately 90 to approximately 120 psia, or any subrange therebetween. The pressure of the steam downstream of the reheater 15 may, for example, exceed 120 psia. For example, under normal operating conditions, steam downstream of the reheater 15 may be supplied from the reheater 15 in a range from approximately 250 to approximately 380 psia, or any subrange therebetween. Thus, the first bypass system 20 may be configured to adjust the pressure of the steam downstream of the reheater 15 from above 120 psia to a range of from approximately 90 to approximately 120 psia, which may be a pressure range suitable for startup or shutdown of the intermediate pressure turbine. It should be understood, however, that the steam pressure ranges suitable for admission to the turbine section 18 are not limited to the range from 90 to 120 psia, and may be any steam pressure ranges desired in a turbine section 18, steam turbine 12 or system 10.

The first bypass system 20 may include at least one bypass line 21 and at least one control valve 22. Further, in one embodiment, the at least one bypass line 21 may be a plurality of bypass lines 21, and the at least one control valve 22 may be a plurality of control valves 22. The control valves 22 may be operably connected to the bypass lines 21.

The first bypass system 20 may further include a controller 23 and a pressure gauge 24. The pressure gauge 24 may be operably connected to the controller 23. The pressure gauge 24 may be configured to monitor the pressure of steam downstream of the reheater 15. The controller 23 may be configured to communicate with the pressure gauge 24 and operate the control valves 22, such that the first bypass system 20 operates to adjust the pressure of steam downstream of the reheater 15 to a pressure range suitable for admission to the turbine section 18.

For example, in an exemplary aspect of an embodiment, the controller 23 may be configured to operate the control valves 22 in sequence. In another exemplary aspect of an embodiment, the controller 23 may be configured to operate the control valves 22 in tandem. It should be understood, however, that the configuration of the controller 23 to operate the control valves 22 is not limited to operation of the control valves 22 in sequence or in tandem, but may be any configuration designed to adjust the pressure of steam downstream of the reheater 15.

In an exemplary aspect of an embodiment, the controller 23 may be configured to operate the control valves 22 in sequence. For example, operating the control valves 22 in sequence may include opening the control valves 22 when steam downstream of the reheater 15 reaches a fixed pressure limit, setting a first control valve 22.1 to auto-control, and setting a second control valve 22.2 to auto-control when the first control valve 22.1 reaches a fixed valve stroke limit. In one embodiment, the step of opening the control valves 22 may include setting the control valves 22 at a minimum stroke setting. In one embodiment, the step of setting a control valve 22 to auto-control may include setting the control valve 22 at an adjustable stroke setting, such that the stroke of the control valve 22 automatically adjusts in order to adjust or maintain the pressure of steam downstream of the reheater 15 at a pressure range suitable for admission to the turbine section 18. Further, the step of setting a second control valve to auto-control when a first control valve reaches a fixed valve stroke limit may be repeated in sequence for multiple control valves 22. It should be understood that the control valves 22 are not limited to a first control valve 22.1 and a second control valve 22.2, but may include any number of control valves 22 necessary to adjust the pressure of steam downstream of the reheater 15.

For example, in an exemplary aspect of an embodiment, the pressure gauge 24 of the first bypass system 20 may sense that the pressure of the steam downstream of the reheater 15 is at a pressure exceeding a fixed pressure limit. The pressure gauge 24 may communicate this condition to the controller 23. The controller 23 may then operate the control valves 22 by opening the control valves 22 to a minimum stroke setting and setting a first control valve 22.1 to auto-control. The stroke of the first control valve 22.1 may thus automatically adjust, to adjust or maintain the pressure of the steam downstream of the reheater 15 in a pressure range suitable for admission to the turbine section 18, until the stroke of the first control valve 22.1 reaches a fixed valve stroke limit. If the first control valve 22.1 reaches the fixed valve stroke limit, the controller 23 may operate to set a second control valve 22.2 to auto-control. If the second control valve 22.2 reaches the fixed valve stroke limit, the controller 23 may operate to set another control valve 22 to auto-control, and this sequence may be repeated for multiple control valves 22. This procedure may be followed to adjust the pressure of steam downstream of the reheater 15 to a pressure range suitable for admission to the turbine section 18, such as to a pressure range suitable for startup or shutdown of the turbine section 18.

In one embodiment, the fixed pressure limit may be 120 psia. In one embodiment, the fixed valve stroke limit may be 90%. In another embodiment, the fixed valve stroke limit may be 100%. In yet another embodiment, the fixed valve stroke limit may be a range from 90% to 100%, or any subrange therebetween.

In an exemplary aspect of an embodiment, the first bypass system 20 may be constructed at least partially from existing combined cycle power plant equipment. For example, existing combined cycle power plant components may be rerouted, converted, or modified to construct the first bypass system 20. In one embodiment, various bypass lines 21 and control valves 22 of the first bypass system 20 may be constructed from existing combined cycle power plant equipment. In one embodiment, control valve 22.1, its associated bypass line 21, and controller 23 may be constructed from existing combined cycle power plant equipment. For example, control valve 22.1, its associated bypass line 21, and controller 23 may be rerouted, converted, or modified for use in the first bypass system 20. The use of existing equipment to construct the first bypass system 20 may be advantageous, as the use of existing equipment may make the first bypass system 20 inexpensive to install, and may allow the first bypass system 20 to be installed within limited space requirements. Further, the limited use of additional piping may, for example, prevent large, uncontrollable pressure drops, which could damage the power plant. It should be understood that the existing combined cycle power plant equipment of the present invention is not limited to bypass lines 21 or control valves 22, but may be any combined cycle power plant equipment that could be used to construct the bypass system 20.

In one embodiment, the combined cycle power plant startup system 10 may include a second bypass system 30. The second bypass system 30 may be configured to adjust the pressure of steam upstream of the reheater 15 by routing steam upstream of the reheater 15 to the first bypass system 20. In one embodiment, the second bypass system 30 may be configured to route steam from the first drum section 41 to the first bypass system 20. In one embodiment, the second bypass system 30 may be configured to route steam through the first bypass system 20 to the condenser 16. In an exemplary aspect of an embodiment, the second bypass system 30 may be a high pressure bypass system.

For example, routing steam upstream of the reheater 15 to the first bypass system 20 may adjust the pressure of the steam at the reheater inlet 15.1. Adjusting the pressure of the steam at the reheater inlet 15.1 may adjust the temperature of the steam exiting the turbine section 19. For example, lowering the pressure of the steam at the reheater inlet 15.1 may lower the temperature of the steam exiting the turbine section 19. Adjusting the temperature of the steam exiting the turbine section 19 may reduce the strain on the system 10.

Further, routing steam upstream of the reheater 15 to the first bypass system 20 may adjust the pressure of the steam upstream of the turbine section 19 and the control valve 46. Adjusting the pressure of the steam upstream of the turbine section 19 and control valve 46 may adjust the pressure drop across the control valve 46. For example, lowering the pressure of the steam upstream of the turbine section 19 and control valve 46 may lower the pressure drop across the control valve 46. Adjusting the pressure drop across the control valve 46 may increase the reliability and longevity of the control valve 46.

The second bypass system 30 may include at least one bypass line 31 and at least one control valve 32. Further, in one embodiment, the at least one bypass line 31 may be a plurality of bypass lines 31, and the at least one control valve 32 may be a plurality of control valves 32. The control valves 32 may be operably connected to the bypass lines 31.

The second bypass system 30 may further include a controller 33 and a pressure gauge 34. The pressure gauge 34 may be operably connected to the controller 33. The pressure gauge 34 may be configured to monitor the pressure of the steam upstream of the reheater 15. The controller 33 may be configured to communicate with the pressure gauge 34 and operate the control valves 32, such that the second bypass system 30 operates to adjust the pressure of steam upstream of the reheater 15. For example, in one embodiment, the controller 33 may be configured to operate the control valves 32, such as, for example, operating the control valves 32 in tandem or in sequence, as discussed above regarding the first bypass system 20, when steam upstream of the reheater 15 reaches a fixed pressure limit. For example, in one embodiment, the controller 34 may operate the control valves 32 by opening the control valves 32 to a minimum stroke setting and sequentially setting the control valves 32 to auto-control when the control valves 32 reach a fixed valve stroke limit, as discussed above regarding the first bypass system 20. In one embodiment, the controller 33 may be configured to operate the control valves 32 when steam immediately upstream of reheater inlet 15.1 reaches a fixed pressure limit.

For example, in an exemplary aspect of an embodiment, the pressure gauge 34 may sense that the pressure of steam upstream of the reheater 15, such as immediately upstream of reheater inlet 15.1, is at a pressure exceeding a fixed pressure limit. The pressure gauge 34 may communicate this condition to the controller 33. The controller 33 may then operate to open the control valves 32 and sequentially set the control valves 32 to auto-control, as discussed above regarding the first bypass system 20.

In one embodiment, the fixed pressure limit may be 130 psia. In one embodiment, the fixed valve stroke limit may be 90%. In another embodiment, the fixed valve stroke limit may be 100%. In yet another embodiment, the fixed valve stroke limit may be a range from 90% to 100%, or any subrange therebetween.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combined cycle power plant startup system comprising:
    a steam turbine, the steam turbine comprising a turbine section;
    a heat recovery steam generator operably connected to the steam turbine for providing steam to the steam turbine, the heat recovery steam generator comprising a reheater;
    a condenser; and
    a bypass system configured to adjust the steam pressure downstream of the reheater by routing steam downstream of the reheater to the condenser, the bypass system comprising a plurality of bypass lines, a plurality of control valves operably connected to the plurality of bypass lines, a pressure gauge configured to monitor the steam pressure downstream of the reheater, and a controller programmed to communicate with the pressure gauge and operate the plurality of control valves in sequence, wherein operating the plurality of control valves in sequence comprises opening the plurality of control valves when steam downstream of the reheater reaches a fixed pressure limit, setting a first control valve to auto-control, and setting a second control valve to auto-control when the first control valve reaches a fixed valve stroke limit, and wherein setting one of the first control valve or the second control valve to auto-control comprises setting the control valve to an adjustable stroke setting, such that a stroke of the control valve automatically adjusts in order to adjust or maintain the pressure of steam downstream of the reheater at a pressure range suitable for admission to the turbine section, the steam pressure being adjusted to a pressure range suitable for admission to the turbine section.

2. The combined cycle power plant startup system of claim 1, wherein the turbine section is an intermediate pressure turbine.

3. The combined cycle power plant startup system of claim 1, wherein the fixed pressure limit is about 120 pounds per square inch atmospheric.

4. The combined cycle power plant startup system of claim 1, wherein the fixed valve stroke limit is about 90%.

5. The combined cycle power plant startup system of claim 1, wherein the steam pressure is adjusted to a pressure range suitable for turbine section startup.

6. The combined cycle power plant startup system of claim 5, wherein the pressure range is about 90 to about 120 pounds per square inch atmospheric.

7. The combined cycle power plant startup system of claim 1, wherein the bypass system is a first bypass system, further comprising a second bypass system configured to adjust the steam pressure upstream of the reheater by routing steam upstream of the reheater to the first bypass system, the second bypass system comprising at least one bypass line, at least one control valve operably connected to the at least one bypass line, a pressure gauge configured to monitor the steam pressure upstream of the reheater, and a controller configured to communicate with the pressure gauge and regulate the at least one control valve.

8. The combined cycle power plant startup system of claim 7, wherein the at least one bypass line is a plurality of bypass lines, wherein the at least one control valve is a plurality of control valves, and wherein the controller is configured to communicate with the pressure gauge and operate the plurality of control valves in sequence.

9. The combined cycle power plant startup system of claim 8, wherein operating the plurality of control valves in sequence comprises opening a plurality of control valves when steam upstream of the reheater reaches a fixed pressure limit, setting a first control valve to auto-control, and setting a second control valve to auto-control when the first control valve reaches a fixed valve stroke limit.

10. The combined cycle power plant startup system of claim 9, wherein the fixed pressure limit is about 130 pounds per square inch atmospheric.

11. The combined cycle power plant startup system of claim 9, wherein the fixed valve stroke limit is about 90%.

12. A combined cycle power plant startup system comprising:
   a steam turbine, the steam turbine comprising an intermediate pressure turbine;
   a heat recovery steam generator operably connected to the steam turbine for providing steam to the steam turbine, the heat recovery steam generator comprising a reheater;
   a condenser;
   an intermediate pressure bypass system configured to route steam downstream of the reheater to the condenser, the intermediate pressure bypass system comprising a plurality of bypass lines, a plurality of control valves, a pressure gauge configured to monitor the steam pressure downstream of the reheater, and a controller programmed to communicate with the pressure gauge and operate the plurality of control valves in sequence, wherein operating the plurality of control valves in sequence comprises opening the plurality of control valves when steam downstream of the reheater reaches a fixed pressure limit, setting a first control valve to auto-control, and setting a second control valve to auto-control when the first control valve reaches a fixed valve stroke limit, and wherein setting one of the first control valve or the second control valve to auto-control comprises setting the control valve to an adjustable stroke setting, such that a stroke of the control valve automatically adjusts in order to adjust or maintain the pressure of steam downstream of the reheater at a pressure range suitable for admission to the intermediate pressure turbine; and
   a high pressure bypass system configured to route steam upstream of the reheater to the intermediate pressure bypass system, the high pressure bypass system comprising a plurality of bypass lines, a plurality of control valves, a pressure gauge configured to monitor the steam pressure upstream of the reheater, and a controller configured to communicate with the pressure gauge and operate the plurality of control valves in sequence,
   the steam pressure downstream of the reheater being adjusted to a pressure range suitable for intermediate pressure turbine startup.

13. The combined cycle power plant startup system of claim 12, wherein the pressure range is about 90 to about 120 pounds per square inch atmospheric.

14. The combined cycle power plant startup system of claim 12, wherein the fixed pressure limit is about 120 pounds per square inch atmospheric and the fixed valve stroke limit is about 90%.

15. The combined cycle power plant startup system of claim 12, wherein regulating the plurality of high pressure bypass system control valves comprises opening the control valves when steam upstream of the reheater reaches a fixed pressure limit, setting a first control valve to auto-control, and setting a second control valve to auto-control when the first control valve reaches a fixed valve stroke limit.

16. The combined cycle power plant startup system of claim 15, wherein the fixed pressure limit is about 130 pounds per square inch atmospheric and the fixed valve stroke limit is about 90%.

* * * * *